US012624788B2

(12) United States Patent
Trivedi et al.

(10) Patent No.: US 12,624,788 B2
(45) Date of Patent: May 12, 2026

(54) PIPE NAVIGATION APPARATUS WITH BYPASS FLUID CHANNEL

(71) Applicant: General Electric Company, Schenectady, NY (US)

(72) Inventors: Deepak Trivedi, Halfmoon, NY (US); Andrew Thomas Cross, Waterford, NY (US); Christopher Walter Falcone, Schenectady, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 793 days.

(21) Appl. No.: 17/981,934

(22) Filed: Nov. 7, 2022

(65) Prior Publication Data

US 2024/0151343 A1 May 9, 2024

(51) Int. Cl.
| | |
|---|---|
| *F16L 55/34* | (2006.01) |
| *F16L 55/40* | (2006.01) |
| *F16L 55/44* | (2006.01) |

(52) U.S. Cl.
CPC ............... *F16L 55/34* (2013.01); *F16L 55/40* (2013.01); *F16L 55/44* (2013.01)

(58) Field of Classification Search
CPC . F16L 55/00; F16L 55/26; F16L 55/28; F16L 55/30; F16L 55/32; F16L 55/38;
(Continued)

(56) References Cited

U.S. PATENT DOCUMENTS

| | | | |
|---|---|---|---|
| 3,525,111 A | 8/1970 | Arx | |
| 4,475,260 A | 10/1984 | Beck | |

(Continued)

FOREIGN PATENT DOCUMENTS

| | | |
|---|---|---|
| CN | 203162435 U | 8/2013 |
| CN | 105485471 B | 5/2017 |

(Continued)

OTHER PUBLICATIONS

Liu et al., "Worm-Inspired Soft Robots Enable Adaptable Pipeline and Tunnel Inspection", Advanced Intelligent Systems, Sep. 27, 2021, 4(1).

(Continued)

*Primary Examiner* — S. Joseph Morano
*Assistant Examiner* — Heaven R Buffington
(74) *Attorney, Agent, or Firm* — Armstrong Teasdale LLP

(57) ABSTRACT

A navigation apparatus for use in navigating a pipe having a sidewall defining an interior cavity is provided. The navigation apparatus includes a body assembly having a first end and a second end and configured to move through the interior cavity of the pipe. The navigation apparatus also includes a channel defining a fluid passageway extending at least partly between the first end and the second end of the body assembly, an inlet for fluid from the interior cavity of the pipe to enter the fluid passageway, and an outlet for the fluid to exit the fluid passageway and return to the interior cavity of the pipe. The channel is configured to allow the fluid to flow through the fluid passageway and from the first end of the body assembly to the second end of the body assembly as the body assembly moves through the interior cavity of the pipe.

20 Claims, 6 Drawing Sheets

(58) Field of Classification Search
CPC ....... F16L 55/40; F16L 55/44; F16L 2101/30; F16L 2101/00; F16L 55/34; E21B 23/001
USPC ...................................................... 104/138.2
See application file for complete search history.

(56) References Cited

U.S. PATENT DOCUMENTS

| | | | |
|---|---|---|---|
| 5,423,630 A | 6/1995 | Imoto et al. |
| 6,107,795 A | 8/2000 | Smart |
| 6,371,631 B1 | 4/2002 | Reutemann |
| 6,514,346 B1 | 2/2003 | Nichols |
| 6,959,772 B2 | 11/2005 | Stegmaier et al. |
| 7,210,364 B2 | 5/2007 | Ghorbel et al. |
| 7,303,010 B2 | 12/2007 | de Guzman et al. |
| 7,812,328 B2 | 10/2010 | Betz |
| 2003/0039752 A1 | 2/2003 | Winiewicz et al. |
| 2012/0137458 A1 | 6/2012 | Knapp |
| 2019/0323645 A1 | 10/2019 | Polygerinos et al. |
| 2021/0025533 A1 | 1/2021 | Duncan et al. |
| 2021/0025534 A1 | 1/2021 | Duncan et al. |
| 2021/0025535 A1 | 1/2021 | Duncan et al. |
| 2021/0025536 A1 | 1/2021 | Duncan et al. |

FOREIGN PATENT DOCUMENTS

| | | | | |
|---|---|---|---|---|
| CN | 107830307 B | 4/2019 | | |
| CN | 111207265 B | 9/2020 | | |
| CN | 112013202 B | 12/2021 | | |
| DE | 102008014420 A1 * | 10/2009 | ............ | H02G 1/088 |
| EP | 2626613 A1 | 8/2013 | | |
| WO | 2016169732 A1 | 10/2016 | | |
| WO | 2017197418 A1 | 11/2017 | | |

OTHER PUBLICATIONS

Yousef et al., "Worm Robot with Dynamic Adaptation to Pipe Diameter for In-Pipe Inspection", International Journal of Engineering and Innovative Technology (IJEIT), Apr. 2014, pp. 286-292, 3(10).

* cited by examiner

PIPE NAVIGATION APPARATUS WITH BYPASS FLUID CHANNEL

This invention was made with Government support under contract number D19AC00018 awarded by the Defense Advanced Research Projects Agency (DARPA). The Government has certain rights in this invention.

BACKGROUND

The field of the disclosure relates to systems for navigating pipes, and more particularly to pipe navigation apparatus including a bypass fluid channel.

Pipes are commonly used to transport fluids. For example, typical pipes include a cylindrical sidewall that defines an interior cavity. During operation, fluids are transported within the interior cavity of the pipes. Sometimes, the fluids that are transported through the pipes have characteristics that can cause wear, deterioration, or otherwise affect the properties of the pipes. As a result, the pipes may require routine inspection and repair. However, the interior cavity of the pipes may be difficult to access for routine maintenance. For example, at least some known pipes are used to transport fluids having high temperatures, pressures, and/or other properties that create conditions which are inhospitable for at least some known navigation apparatus. Moreover, at least some pipes are difficult for at least some known apparatus to travel through because of the pipes' size, shape, and obstacles within the interior cavity. In addition, at least some known navigation apparatus cannot travel through pipes and/or perform a maintenance operation if the fluid is within the interior cavity of the pipe. As a result, the fluid must be removed from the interior cavity of the pipe and the pipe placed out-of-service while the navigation apparatus is within the interior cavity of the pipe. Accordingly, it would be desirable to provide a system for navigating pipes including a navigation apparatus with a bypass fluid channel that facilitates operation of the navigation apparatus when fluid is within the interior cavity of the pipes.

BRIEF DESCRIPTION

In one aspect, a navigation apparatus for use in navigating a pipe having a sidewall defining an interior cavity is provided. The navigation apparatus includes a body assembly having a first end and a second end and configured to move through the interior cavity of the pipe. The navigation apparatus also includes a channel defining a fluid passageway extending at least partly between the first end and the second end of the body assembly, an inlet for fluid from the interior cavity of the pipe to enter the fluid passageway, and an outlet for the fluid to exit the fluid passageway and return to the interior cavity of the pipe. The channel is configured to allow the fluid to flow through the fluid passageway and from the first end of the body assembly to the second end of the body assembly as the body assembly moves through the interior cavity of the pipe.

In another aspect, a system for use in navigating a pipe having a sidewall defining an interior cavity is provided. The system includes a navigation apparatus including a body assembly with a plurality of sections configured to interact with the sidewall of the pipe and move the body assembly through the pipe. The navigation apparatus also includes a channel defining a fluid passageway. The channel is configured for fluid from the interior cavity of the pipe to flow through the fluid passageway and bypass the body assembly as the body assembly moves through the interior cavity of the pipe. The system also includes a controller communicatively coupled to the navigation apparatus and configured to send instructions to the navigation apparatus to cause the body assembly to move through the interior cavity of the pipe.

In yet another aspect, a method for moving a navigation apparatus through a pipe having a sidewall defining an interior cavity is provided. The method includes moving a body assembly of the navigation apparatus through the interior cavity of the pipe. The body assembly has a first end and a second end. The navigation apparatus includes a channel defining a fluid passageway extending at least partly between the first end and the second end of the body assembly. The method also includes directing fluid from the interior cavity of the pipe to flow through the fluid passageway and from the first end of the body assembly to the second end of the body assembly as the body assembly moves through the interior cavity of the pipe.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
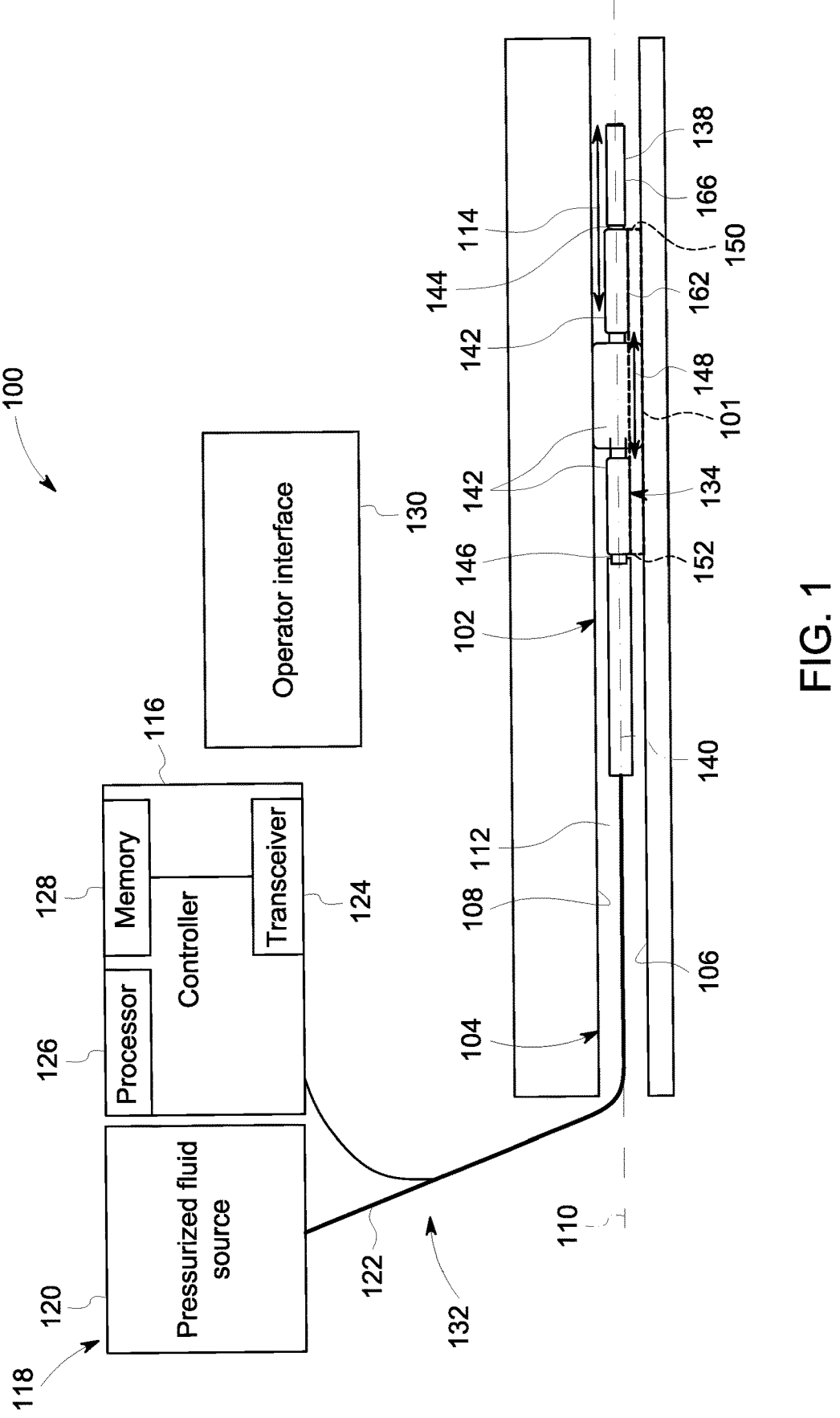
FIG. 1 is a schematic diagram of a system including a navigation apparatus traveling underground, the navigation apparatus including a bypass fluid channel.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), and application specific integrated circuit (ASIC), and other programmable circuits, and these terms are used interchangeably herein. In the embodiments described herein, "memory" may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a PLC, a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Embodiments described herein relate to a system including a navigation apparatus having a bypass fluid channel. The navigation apparatus includes a body assembly configured to move through an interior cavity of a pipe. The bypass fluid channel defines a fluid passageway extending at least partly between a first end and a second end of the body assembly. The bypass fluid channel is configured for fluid from an interior cavity of the pipe to flow through the fluid passageway as the body assembly moves through the interior cavity of the pipe. For example, the bypass fluid channel includes an inlet for fluid from the interior cavity of the pipe to enter the fluid passageway and an outlet for the fluid to exit the fluid passageway and return to the interior cavity of the pipe. In some embodiments, the body assembly includes a plurality of sections that are configured to interact with a sidewall of the pipe and cause the body assembly to move through the interior cavity of the pipe. The bypass fluid channel is configured to allow the fluid to flow through the fluid passageway as the plurality of sections of the body assembly interact with the sidewall. As a result, the bypass fluid channel facilitates operation of the navigation apparatus when fluid is within the interior cavity of the pipe and reduces the amount of time that the pipe is out-of-service for maintenance operations.

FIG. 1 is a schematic diagram of a system 100 including a navigation apparatus 102 having a bypass fluid channel 101 and traveling underground. For example, the navigation apparatus 102 is configured to travel through a pipe 104. Pipe 104 may be any enclosed path through a material. For example, pipe 104 may be a conduit or a tunnel and may have a circular or non-circular cross-section. Pipe 104 includes a sidewall 106 having an interior surface 108 extending around a central axis 110 and defining an interior cavity 112. Navigation apparatus 102 is configured to fit within interior cavity 112 and travel along the length of pipe 104. Accordingly, navigation apparatus 102 facilitates construction of pipe 104 and/or inspection and repair of pipe 104. Moreover, navigation apparatus 102 is self-propelled, meaning that navigation apparatus 102 moves within interior cavity 112 without external propulsion (e.g., a mechanical push or pull force) acting on navigation apparatus 102. The only stimulus acting on navigation apparatus 102 is in the form of electrical or fluidic (hydraulic or pneumatic) actuation. For example, navigation apparatus 102 can propel forward and backward in a worm-like fashion using gaits such as two anchor crawling or peristaltic motion. In some embodiments, navigation apparatus 102 uses fluidic actuators such as fluidic artificial muscles to achieve gaits. The fluidic artificial muscles when actuated can undergo radial expansion to take the shape of pipe 104 and provide anchoring as well as extend or contract axially. Due to the expansion, the fluidic artificial muscles cause restriction in the flow area of the pipe. Therefore, there is a tradeoff between the ability of the fluidic artificial muscles to anchor for providing movement of navigation apparatus 102 and the available cross sectional area for the fluid to flow. In the example embodiment, bypass fluid channel 101 facilitates navigation apparatus 102 moving within interior cavity 112 when fluid is within interior cavity 112. For example, bypass fluid channel 101 optimizes the flow area available for fluid to bypass navigation apparatus 102 without significantly compromising the anchoring capability of navigation apparatus 102.

During operation, for example, navigation apparatus 102 may be positioned within interior cavity 112 through an opening. In the illustrated embodiment, navigation apparatus 102 travels in a travel direction 114. In some embodiments, navigation apparatus 102 traverses transitions in pipe 104 such as bends or size transitions. As navigation apparatus 102 travels through interior cavity 112, navigation apparatus 102 is configured to form, inspect, and/or repair any portions of pipe 104.

System 100 includes navigation apparatus 102, a controller 116 communicatively coupled to navigation apparatus 102, a fluid supply system 118, and bypass fluid channel 101. Fluid supply system 118 includes a pressurized fluid source 120 that is coupled to navigation apparatus 102 via a fluid line 122. Fluid supply system 118 is configured to regulate pressurized fluid that is delivered to/removed from navigation apparatus 102 for operation of navigation apparatus 102.

In addition, in the example embodiment, controller 116 is configured to provide instructions to move navigation apparatus 102 through pipe 104 and/or to perform inspection or repair operations. Controller 116 includes a transceiver 124, a processor 126, and a memory 128. In some embodiments, controller 116 is positioned remotely from navigation apparatus 102, e.g., controller 116 is located at a base station that enables an operator on an exterior of pipe 104 (shown in FIG. 1) to interact with navigation apparatus 102, and/or controller 116 can be at least partly incorporated into and located on board navigation apparatus 102. Transceiver 124 is communicatively coupled with navigation apparatus 102 and is configured to send information to and receive information from a transceiver of navigation apparatus 102. In some embodiments, transceiver 124 and a transceiver on navigation apparatus 102 communicate wirelessly. In alternative embodiments, navigation apparatus 102 and controller 116 communicate in any manner that enables system 100 to operate as described herein. For example, in some embodiments, controller 116 and navigation apparatus 102 exchange information through a wired link extending between navigation apparatus 102 and controller 116.

In addition, in some embodiments, controller 116 is at least partly located on board navigation apparatus 102 and is configured to execute instructions for controlling components of navigation apparatus 102, such as a maintenance tool and drive systems. For example, controller 116 executes instructions that cause navigation apparatus 102 to move in a selected direction. In alternative embodiments, navigation apparatus 102 includes any controller that enables system 100 to operate as described herein. In some embodiments, controller 116 is not located on board navigation apparatus 102.

In some embodiments, navigation apparatus 102 includes one or more sensors and/or repair tools or pipe maintenance tools. For example, in some embodiments, navigation apparatus 102 includes a repair tool configured to repair interior surface 108, and/or an inspection tool configured to inspect a portion of interior cavity 112.

Also, in the example embodiment, an operator interface 130 is configured to display information relating to the characteristics detected by navigation apparatus 102 for interpretation by the operator. Operator interface 130 may be included on a remote computing device (not shown) and/or may be incorporated with controller 116. Operator interface 130 may include, among other possibilities, a web browser and/or a client application. For example, in some embodiments, operator interface 130 displays images of interior surface 108 based on received signals. In some embodiments, operator interface 130 allows an operator to input and/or view information relating to control of navigation apparatus 102. In the example embodiment, operator interface 130 is configured to display information relating to the state of one or more of a maintenance tool and a power source for interpretation by the operator. For example, state information may include a position of navigation apparatus 102 along a length of pipe 104 (shown in FIG. 1). State information may also include, for example and without limitation, a charge status of a power source, a current draw for various drive and positioning motors, a pressure in one or more muscles, a diameter and/or length of one or more muscles, a state of one or more valves, and/or a flow rate in a channel of the fluidic circuit. In various embodiments, processor 126 translates operator inputs into steering, tool motion, camera control, sensor control, sensor motion, and/or any other commands and sends information via transceiver 124 to navigation apparatus 102 via a transceiver of navigation apparatus 102. In some embodiments, operator control of navigation apparatus 102 is in real time, such as through a joystick, a keyboard, a touchscreen, a remote motion capture system, and/or a wearable motion capture system or other interface having similar function. In other embodiments, navigation apparatus 102 is controlled partially or wholly according to a pre-programmed routine. In further embodiments, navigation apparatus 102 is at least partially automated. In some embodiments, an operator inputs information such as operation goals or conditional directions. In further embodiments, information, such as information received by controller 116 from navigation apparatus 102, control data sent to navigation apparatus 102, and additional operator inputs or state information (e.g., location, time, orientation, datalink quality, battery levels, repair material levels, failure mode indicators), is logged into memory 128.

Moreover, in the example embodiment, controller 116 is positioned on the exterior of pipe 104 and communicates with navigation apparatus 102 positioned within interior cavity 112 of pipe 104. For example, controller 116 is configured to send information to navigation apparatus 102 relating to the propulsion and/or steering of navigation apparatus 102 while navigation apparatus 102 is moving within interior cavity 112 of pipe 104 through a wireless connection and/or a tether 132. In alternative embodiments, controller 116 and navigation apparatus 102 are configured in any manner that enables system 100 to operate as described herein.

In the example embodiment, navigation apparatus 102 includes a body assembly 134 and a tip 138. Body assembly 134 of navigation apparatus 102 includes a first end 144 and a second end 146 and has a longitudinal axis 140. Body assembly 134 includes a plurality of sections 142 that extend along longitudinal axis 140. Sections 142 of body assembly 134 are modular and are detachably coupled together. Sections 142 of body assembly 134 are configured to move body assembly 134 through interior cavity 112 of pipe 104. For example, sections 142 of body assembly 134 selectively expand and contract (e.g., widths and/or lengths of sections 142 selectively increase and/or decrease) to propel body assembly 134 through pipe 104. For example, each section 142 of body assembly 134 is configured to switch from a first configuration having a first length and/or a first width to a second configuration having a second length and/or a second width. For example, sections 142 may each include pneumatic or hydraulic artificial muscles having elastomeric tubular membranes with fiber reinforcements and radial and axial actuators. The artificial muscles operate based on instructions from controller 116 to cooperatively propel body assembly 134 in desired directions. As a result, sections 142 of body assembly 134 are designed to provide an axial force and a radial force that propel body assembly 134 and tether 132 through underground locations. In the example embodiment, body assembly 134 and tether 132 do not require a separate linear actuator for propulsion. In some embodiments, body assembly 134 includes at least three sections 142 (e.g., a first section, a second section, and a third section) that are configured to cooperate and provide a crawling action to propel body assembly 134 through pipe 104. In alternative embodiments, navigation apparatus 102 includes any body assembly 134 that enables navigation apparatus 102 to operate as described herein.

Bypass fluid channel 101 defines a fluid passageway 148 extending at least partly between first end 144 and second end 146 of body assembly 134. Bypass fluid channel 101 may be coupled to and/or incorporated into body assembly 134. In some embodiments, fluid passageway 148 extends along an entire length of body assembly 134 from first end 144 to second end 146. Bypass fluid channel 101 is configured to allow the fluid to flow through fluid passageway 148 from first end 144 of body assembly 134 toward second end 146 of body assembly 134 and/or from second end 146 of body assembly 134 toward first end 144 as body assembly 134 moves through interior cavity 112 of pipe 104. For example, bypass fluid channel 101 includes at least one first opening 150 for fluid within interior cavity 112 of pipe 104 to enter or exit fluid passageway 148, and at least one second opening 152 for the fluid to enter or exit fluid passageway 148. The fluid returns to interior cavity 112 of pipe 104 after traveling through fluid passageway 148. Bypass fluid channel 101 is sized to provide sufficient flow rate through fluid passageway 148 to accommodate fluid within interior cavity 112 without substantially interrupting operation of navigation apparatus 102. First opening 150 and second opening 152 each may act as an inlet and/or an outlet depending on a direction of fluid flow within interior cavity 112 and/or a direction of movement of body assembly 134.

In the example embodiment, tip 138 is coupled to first end 144 of body assembly 134. In some embodiments, tip 138 includes at least one of a sensor and/or a repair tool, and tip 138 is configured to perform a maintenance operation within pipe 104. For example, in some embodiments, tip 138 includes, without limitation, any of the following: an applicator, a drill, a grinder, a heater, a welding electrode, a sprayer, an optical sensor (e.g., visible, infrared, and/or multi-spectral sensor), a mechanical sensor (e.g., stylus profilometer, coordinate measurement probe, load transducer, linear variable differential transformer), a thermal sensor (e.g., pyrometer, thermocouple, resistance temperature detector), a magnetic sensor, an acoustic sensor (e.g., piezoelectric, microphone, ultrasound), and an electromagnetic sensor (e.g., eddy current, potential drop, x-ray). In some embodiments, a navigation apparatus on tip 138 is used to provide information for steering navigation apparatus 102 and/or to perform a maintenance operation. In alternative embodiments, navigation apparatus 102 includes any tip 138 that enables navigation apparatus 102 to operate as described herein. For example, in some embodiments, tip 138 is shaped to engage material and displace material as navigation apparatus 102 moves through underground locations.

In addition, in some embodiments, navigation apparatus 102 includes a light source (not shown) configured to irradiate at least a portion of interior cavity 112 to facilitate visual or non-visual steering of navigation apparatus 102 and/or to allow a navigation apparatus to capture images, for example. The light source may be coupled to body assembly 134 and, in some embodiments, may be positionable relative to body assembly 134. In alternative embodiments, navigation apparatus 102 includes any light source that enables navigation apparatus 102 to operate as described herein.

In addition, in the example embodiment, pressurized fluid source 120 is coupled to one or more components of navigation apparatus 102 via fluid line 122. For example, sections 142 of body assembly 134 are configured to selectively switch configurations and propel body assembly 134 when pressurized fluid is delivered to or removed from sections 142 via fluid line 122. In alternative embodiments, system 100 includes any pressurized fluid source 120 that enables system 100 to operate as described herein. For example, in some embodiments, pressurized fluid source 120 includes separate fluid tanks and/or pumps that are coupled to and configured to regulate pressurized fluid in sections 142. In addition, in some embodiments, system 100 includes a plurality of fluid lines 122 coupled to body assembly 134.

Figure 2:
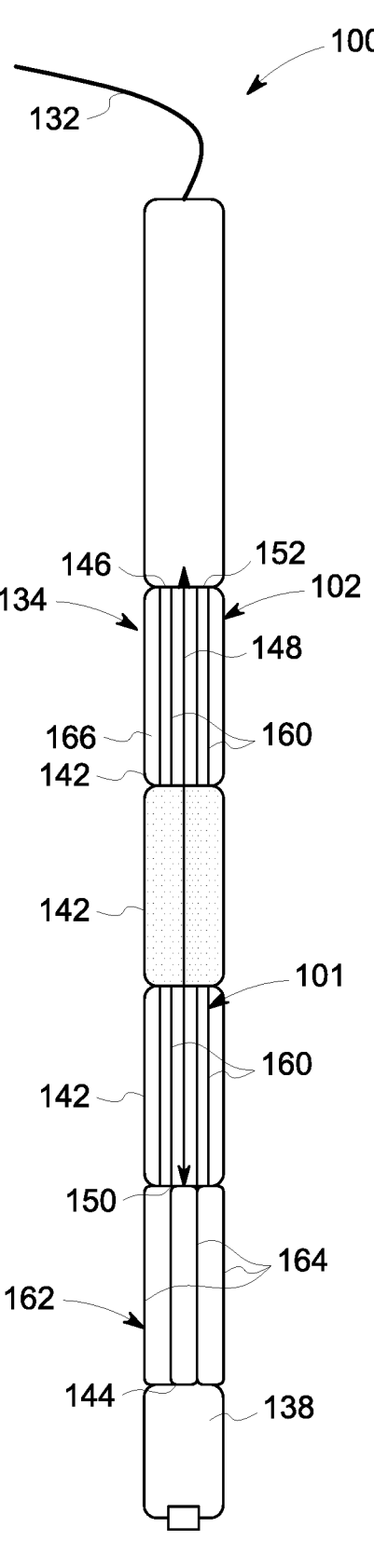
FIG. 2 is a perspective view of a portion of the navigation apparatus shown in FIG. 1.

FIG. 2 is a perspective view of a portion of navigation apparatus 102. Body assembly 134 of navigation apparatus 102 includes at least one steering section 162 that is configured to facilitate steering of navigation apparatus 102 and enable navigation apparatus 102 to navigate bends, obstacles, or other pipe elements within pipe 104. For example, steering section 162 may include a plurality of individually actuated muscles (e.g., pneumatic or hydraulic actuated muscles) 164 that are coupled together and individually positionable to steer navigation apparatus 102. In the example embodiment, steering section 162 includes three individually actuated muscles 164. Tip 138 is coupled to steering section 162 of body assembly 134. In alternative embodiments, navigation apparatus 102 includes any steering section 162 that enables navigation apparatus 102 to operate as described herein. In some embodiments, steering section 162 is omitted.

In the illustrated example embodiment, bypass fluid channel 101 includes a plurality of protrusions 160 positioned to interact with sidewall 106 (shown in FIG. 1) of pipe 104 (shown in FIG. 1) and facilitate fluid flow through fluid passageway 148 as body assembly 134 moves through interior cavity 112 (shown in FIG. 1). In the example embodiment, sections 142 of body assembly 134 have an outer surface 166 defining a circumference. Protrusions 160 are arranged circumferentially around outer surface 166 and positioned to extend radially outward from outer surface 166. In further embodiments, bypass fluid channel 101 includes a plurality of grooves or features such as treads incorporated into outer surface 166. In one embodiment, protrusions 160 are uniformly spaced about the circumference of each respective section 142. Fluid passageway 148 is defined between circumferentially adjacent protrusions 160 on each section 142. In addition, in the example embodiment, protrusions 160 are elongate and extend continuously along the entire length of each section 142 of body assembly 134. In other embodiments, protrusions 160 may be discontinuous and have gaps along the length of one or more sections 142 of body assembly 134. In the illustrated example embodiment, bypass fluid channel 101 includes four protrusions 160 on each section 142. Accordingly, protrusions 160 define a plurality of distinct paths for fluid to flow through. In the illustrated example embodiment, fluid passageway 148 includes four paths defined between four protrusions 160 on each section 142 of body assembly 134. In some embodiments, fluid passageway 148 includes at least two paths defined by at least two protrusions 160. In some embodiments, the distinct paths of fluid passageway 148 are connected by gaps in protrusions 160. In alternative embodiments, navigation apparatus 102 includes any bypass fluid channel 101 that enable navigation apparatus 102 to function as described herein. For example, in some embodiments, bypass fluid channel 101 comprises a conduit, a groove, and/or any other suitable channel.

In some embodiments, bypass fluid channel 101 is coupled to and/or incorporated into any component of navigation apparatus 102. For example, in some embodiments, protrusions 160 may be coupled to and/or incorporated into tip 138 and/or body assembly 134 at distinct locations or continuously along longitudinal axis 140. In further embodiments, bypass fluid channel 101 comprises a conduit that extends through the interior cavity of navigation apparatus 102 within the outer circumference of navigation apparatus 102 and/or on an exterior surface of navigation apparatus 102.

Referring to FIGS. 1 and 2, during operation, navigation apparatus 102 is positioned within interior cavity 112 of pipe 104. Controller 116 provides instructions that cause navigation apparatus 102 to travel through interior cavity 112 of pipe 104. In the example embodiment, body assembly 134 propels navigation apparatus 102 through pipe 104. For example, sections 142 of body assembly 134 are selectively switched between first and second configurations to propel body assembly 134 forward or backward.

Protrusions 160 of bypass fluid channel 101 interact with sidewall 106 of pipe 104 as body assembly 134 is propelled forward. Accordingly, protrusions 160 facilitate movement of body assembly 134. In addition, protrusions 160 of bypass fluid channel 101 form spaces between outer surface 166 of body assembly 134 and sidewall 106 of pipe 104 and define fluid passageway 148 for fluid to flow through as body assembly 134 moves through interior cavity 112. As a result, fluid within interior cavity 112 is able to bypass or flow around body assembly 134 and the fluid does not interfere with movement of body assembly 134.

Figure 3:
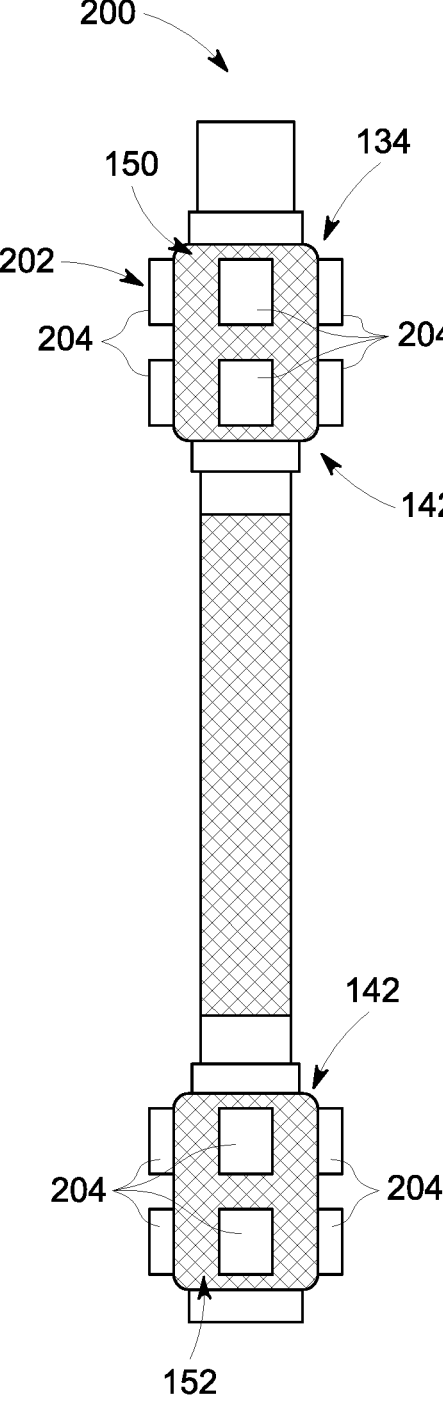
FIG. 3 is a side view of a portion of an alternative embodiment of a navigation apparatus for use with the system shown in FIG. 1, the navigation apparatus including a bypass fluid channel comprising a plurality of protrusions.

FIG. 3 is a side view of an alternative embodiment of a navigation apparatus 200 including a channel 202. Channel 202 includes a plurality of protrusions 204 that are arranged circumferentially around sections 142 of body assembly 134. In the example embodiment, channel 202 includes two sets of protrusions 204 that are spaced longitudinally from each other on each section 142 of body assembly 134. Each set of protrusions 204 includes four of protrusions 204 that are uniformly spaced apart from each other and arranged around the circumference of the respective section 142 of body assembly 134. In alternative embodiments, channel 202 includes any number of protrusions 204 that enable channel 202 to function as described herein.

Figure 4:
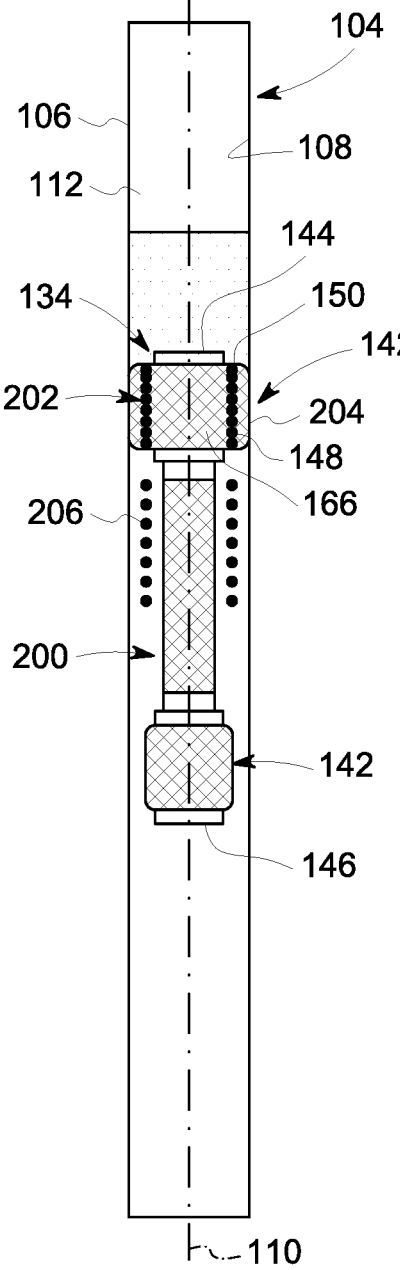
FIG. 4 is a schematic diagram of the navigation apparatus shown in FIG. 3, illustrating the navigation apparatus moving through an interior cavity of a pipe with fluid from the interior cavity of the pipe entering and flowing through the bypass fluid channel.

FIG. 4 is a schematic diagram of navigation apparatus 200 illustrating navigation apparatus 200 moving through interior cavity 112 of pipe 104 and fluid 206 entering fluid passageway 148 from interior cavity 112 of pipe 104. Sections 142 of body assembly 134 selectively expand and/or contract to propel body assembly 134 through interior cavity 112 of pipe 104. For example, as illustrated in FIG. 4, a first section 142 of body assembly 134 expands such that protrusions 204 on first section 142 contact sidewall 106 of pipe 104. Protrusions 204 form a space between body assembly 134 and sidewall 106 of pipe 104 and define fluid passageway 148. As navigation apparatus 102 moves through interior cavity 112, fluid 206 within interior cavity 112 of pipe 104 enters and flows through fluid passageway 148. For example, fluid 206 enters fluid passageway 148 through first opening 150 and flows through fluid passageway 148 between protrusions 204 on first section 142.

Figure 5:
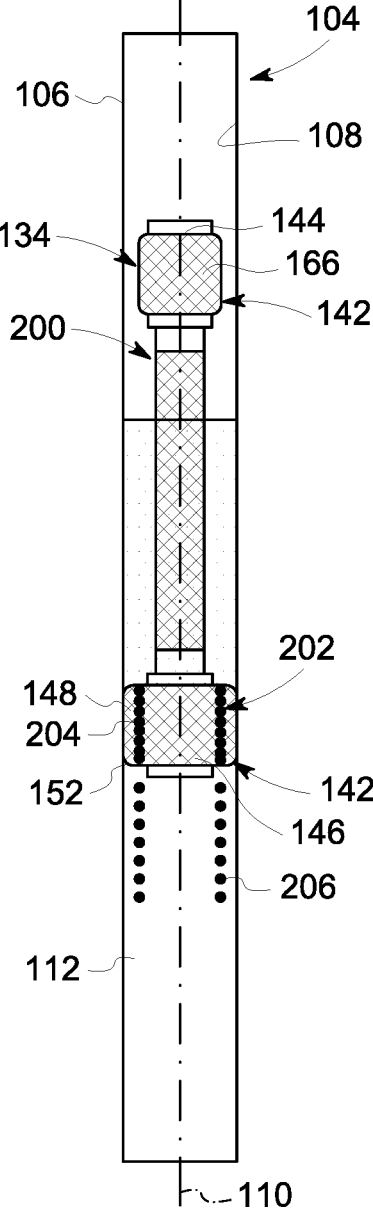
FIG. 5 is a schematic diagram of the navigation apparatus shown in FIGS. 3 and 4, illustrating the navigation apparatus moving through the interior cavity of the pipe with the fluid from the interior cavity of the pipe flowing through and exiting the bypass fluid channel.

FIG. 5 is a schematic diagram of navigation apparatus 200 illustrating navigation apparatus 200 moving through interior cavity 112 of pipe 104 and fluid 206 exiting fluid passageway 148 and returning to interior cavity 112 of pipe 104. As illustrated in FIG. 5, to move body assembly 134 through interior cavity 112 of pipe 104, a second section 142 of body assembly 134 expands such that protrusions 204 on second section 142 contact sidewall 106 of pipe 104. For example, sections 142 may each include pneumatic or hydraulic artificial muscles having elastomeric tubular membranes with fiber reinforcements and radial and axial actuators. The artificial muscles operate to provide fluidic anchoring and provide an axial force and a radial force that propel body assembly 134 through underground locations. For example, navigation apparatus 102 can propel forward and backward in a worm-like fashion using gaits such as two anchor crawling or peristaltic motion. The fluidic artificial muscles when actuated can undergo radial expansion to take the shape of pipe 104 and provide anchoring as well as extend or contract axially. Due to the expansion, the fluidic artificial muscles cause restriction in the flow area of the pipe. Therefore, there is a tradeoff between the ability of the fluidic artificial muscles to anchor for providing movement of navigation apparatus 102 and the available cross sectional area for the fluid to flow. In the example embodiment, protrusions 204 on section 142 form a space between body assembly 134 and sidewall 106 of pipe 104 and define fluid passageway 148. Accordingly, fluid 206 is able to flow through fluid passageway 148 between protrusions 204 on second section 142 as navigation apparatus 102 continues to move through interior cavity 112. After traveling through fluid passageway 148 between protrusions 204, fluid 206 exits fluid passageway 148 through second opening 152, and returns to interior cavity 112. As a result, fluid 206 is able to bypass navigation apparatus 200 within interior cavity 112 and navigation apparatus 200 is able to travel through interior cavity 112 of pipe 104 without fluid interfering with movement of navigation apparatus 200.

Figure 6:
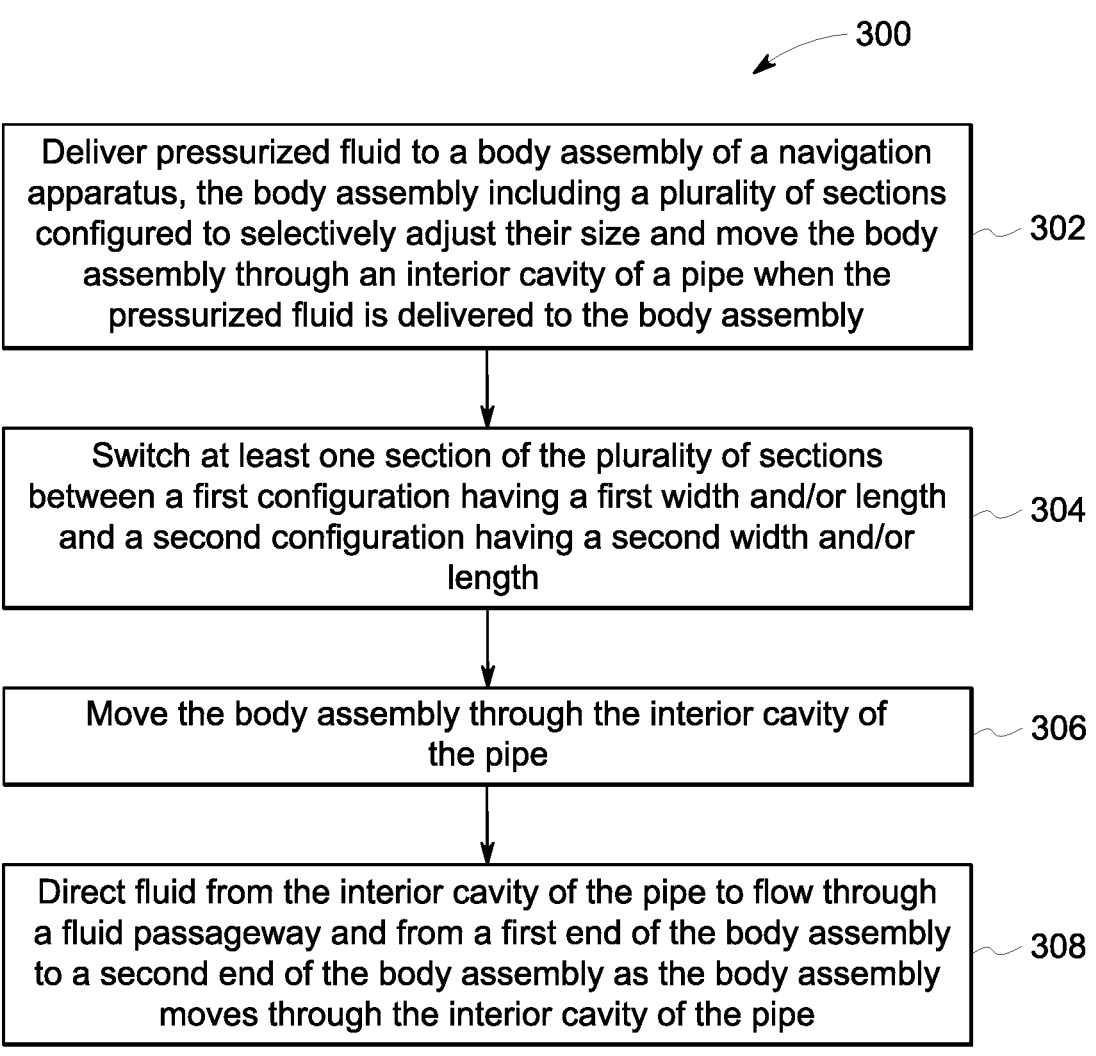
FIG. 6 is a flow chart of an example method of moving the navigation apparatus shown in FIG. 1 through an interior cavity of a pipe.

FIG. 6 is a flow chart of an example method 300 of moving navigation apparatus 102 (shown in FIG. 1) or navigation apparatus 200 (shown in FIG. 3) through pipe 104 (shown in FIG. 1). In reference to FIGS. 1-6, method 300 includes delivering 302 pressurized fluid to body assembly 134 of navigation apparatus 102, switching 304 at least one section 142 of body assembly 134 between the first configuration and the second configuration, and moving 306 body assembly 134 of navigation apparatus 102 through interior cavity 112. For example, in some embodiments, pressurized fluid from pressurized fluid source 120 is delivered to or removed from sections 142 of body assembly 134 to sequentially adjust a length and/or a width of sections 142 and propel body assembly 134 through interior cavity 112.

Also, method 300 includes directing 308 fluid 206 from interior cavity 112 of pipe 104 to flow through fluid passageway 148 and from first end 144 of body assembly 134 to second end 146 of body assembly 134 as body assembly 134 moves through interior cavity 112 of pipe 104. For example, bypass fluid channel 101 is positioned to interact with sidewall 106 of pipe 104 and provide space between body assembly 134 and sidewall 106 as body assembly 134 moves through interior cavity 112. In the example illustrated embodiment, protrusions 160 are positioned circumferentially around and extend radially outward from an outer surface of body assembly 134 and/or tip 138 coupled to body assembly 134. Protrusions 160 interact with sidewall 106 when sections 142 of body assembly 134 expand such that sidewall 106 is within the reach of protrusions 160. Protrusions 160 provide a friction force with sidewall 106 and facilitate movement of body assembly 134. Fluid passageway 148 is defined between protrusions 160 and facilitates fluid flowing past sections 142 when sections 142 are expanded.

In some embodiments, method 300 includes directing fluid 206 to flow into fluid passageway 148 from within interior cavity 112 of pipe 104 through first opening 150 or second opening 152, and directing fluid 206 to exit fluid passageway 148 through second opening 152 or first opening 150 to return to interior cavity 112 of pipe 104. In the example embodiment, first opening 150 and second opening 152 are formed by opposed, open ends of bypass fluid channel 101 and defined by protrusions 160 and outer surface 166. Fluid 206 may be directed through fluid passageway 148 along an entire length of body assembly 134 or only along portions of body assembly 134 that interact with sidewall 106. For example, bypass fluid channel 101 extends at least along expandable sections 142 of body assembly 134 and is configured to direct fluid 206 past sections 142 when respective sections 142 are expanded towards sidewall 106 of pipe 104.

In the example embodiment, any steps of method 300 are repeated any number of times required for navigation apparatus 102 to travel a desired distance through pipe 104.

An example technical effect of the methods, systems, and apparatus described herein includes at least one of: (a) reducing the time that pipes are out-of-service for maintenance operations; (b) enabling maintenance operations and/or inspection and repair of an interior cavity of a pipe when fluid is present within the interior cavity; and (c) improving control and steering of navigation apparatus traveling through pipes.

Example embodiments of systems and methods for use in pipe maintenance operations are described above in detail. The methods and systems are not limited to the specific embodiments described herein, but rather, components of systems and/or steps of the methods may be utilized independently and separately from other components and/or steps described herein. For example, the method may also be used in combination with other components, and are not limited to practice only with pipes as described herein. Rather, the example embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A navigation apparatus for use in navigating a pipe having a sidewall defining an interior cavity, said navigation apparatus comprising:
    a body assembly configured to move through the interior cavity of the pipe, said body assembly comprising:
    a first end;
    a second end;
    a body section positioned between said first end and said second end, said body section having an outer surface and a plurality of protrusions arranged on said outer surface and extending in a radial direction outward therefrom, said body section configured to selectively expand and contract said outer surface in the radial direction between a first configuration, in which said plurality of protrusions interact with the sidewall of the pipe, and a second configuration, in which said plurality of protrusions are spaced from the sidewall of the pipe;
    a channel defining a fluid passageway extending at least partly between said first end and said second end of said body assembly, said fluid passageway extending between said plurality of protrusions when said body section is in the first configuration;
    an inlet for fluid from the interior cavity of the pipe to enter the fluid passageway; and
    an outlet for the fluid to exit the fluid passageway and return to the interior cavity of the pipe, wherein said channel is configured to allow the fluid to flow through the fluid passageway and from said first end of said body assembly to said second end of said body assembly as said body assembly moves through the interior cavity of the pipe.

2. The navigation apparatus in accordance with claim 1, wherein said body assembly comprises a plurality of body sections including the body section, the plurality of body sections each being configured to interact with the sidewall of the pipe and move said body assembly through the pipe, and wherein said channel is configured to allow the fluid to flow through the fluid passageway when said plurality of body sections interact with the sidewall.

3. The navigation apparatus in accordance with claim 1, wherein said plurality of protrusions are spaced circumferentially about said outer surface, wherein the fluid passageway is defined between circumferentially adjacent protrusions of said plurality of protrusions.

4. The navigation apparatus in accordance with claim 3, wherein said fluid passageway comprises a plurality of distinct paths defined between said plurality of protrusions.

5. The navigation apparatus in accordance with claim 1, wherein said channel is coupled to and/or incorporated into the outer surface.

6. The navigation apparatus in accordance with claim 1, wherein said channel extends along an entire length of said body assembly from said first end to said second end.

7. The navigation apparatus in accordance with claim 1, wherein said body assembly comprises a plurality of pneumatic or hydraulic artificial muscles having elastomeric membranes, and wherein said channel is coupled to and/or incorporated into said elastomeric membranes.

8. The navigation apparatus in accordance with claim 1, wherein said body assembly further comprises:
    an additional body section having an additional outer surface and an additional plurality of protrusions arranged on said additional outer surface and extending in the radial direction outward therefrom, said additional body section configured to selectively expand and contract said additional outer surface in the radial direction between a first configuration, in which said additional plurality of protrusions interact with the sidewall of the pipe, and a second configuration, in which said additional plurality of protrusions are spaced from the sidewall of the pipe.

9. The navigation apparatus in accordance with claim 8, wherein said body section is positioned between said first end and said additional body section in an axial direction.

10. A system for use in navigating a pipe having a sidewall defining an interior cavity, said system comprising:
    a navigation apparatus comprising:
    a body assembly comprising a plurality of body sections configured to interact with the sidewall of the pipe and move said body assembly through the pipe, said plurality of body sections comprising a first body section having an outer surface and a plurality of protrusions arranged on said outer surface and extending in a radial direction outward therefrom, said body section configured to selectively expand and contract said outer surface in the radial direction between a first configuration, in which said plurality of protrusions interact with the sidewall of the pipe, and a second configuration, in which said plurality of protrusions are spaced from the sidewall of the pipe; and a channel defining a fluid passageway, wherein said channel is configured for fluid from the interior cavity of the pipe to flow through the fluid passageway and bypass said body assembly as said body assembly moves through the interior cavity of the pipe, the fluid passageway extending between said plurality of protrusions when said body section is in the first configuration; and a controller communicatively coupled to said navigation apparatus and configured to send instructions to said navigation apparatus to cause said body assembly to move through the interior cavity of the pipe.

11. The system in accordance with claim 10, wherein said plurality of protrusions are spaced apart about a circumference of said body assembly, wherein the fluid passageway is defined between circumferentially adjacent protrusions of said plurality of protrusions.

12. The system in accordance with claim 10, wherein said channel is coupled to and/or incorporated into said outer surface.

13. The system in accordance with claim 10, wherein said channel extends along an entire length of said body assembly.

14. The system in accordance with claim 10, wherein said plurality of body sections comprises pneumatic or hydraulic artificial muscles having elastomeric membranes, and wherein said channel is coupled to and/or incorporated into said elastomeric membranes.

15. The system in accordance with claim 10, wherein said navigation apparatus further comprises:

an inlet for the fluid from the interior cavity of the pipe to enter the fluid passageway; and an outlet for the fluid to exit the fluid passageway and return to the interior cavity of the pipe.

16. A method for moving a navigation apparatus through a pipe having a sidewall defining an interior cavity, said method comprising:

moving a body assembly of the navigation apparatus through the interior cavity of the pipe, the body assembly having a first end, a second end, and a body section positioned between the first end and the second end, the body section having an outer surface and a plurality of protrusions arranged on the outer surface and extending in a radial direction outward therefrom, the navigation apparatus including a channel defining a fluid passageway extending at least partly between the first end and the second end of the body assembly;

expanding the outer surface in the radial direction to a first configuration, in which the plurality of protrusions interact with the sidewall of the pipe, from a second configuration, in which the plurality of protrusions are spaced from the sidewall of the pipe; and directing fluid from the interior cavity of the pipe to flow through the fluid passageway, between the plurality of protrusions, and from the first end of the body assembly to the second end of the body assembly as the body assembly moves through the interior cavity of the pipe.

17. The method in accordance with claim 16, wherein moving the body assembly of the navigation apparatus through the interior cavity of the pipe comprises contacting the sidewall of the pipe with a plurality of body sections of the body assembly and changing a size of at least one section of the plurality of body sections, the plurality of body sections including the body section, wherein the channel is configured to allow the fluid to flow through the fluid passageway when the plurality of body sections contact the sidewall.

18. The method in accordance with claim 16, further comprising:

directing the fluid to flow into the fluid passageway from within the interior cavity of the pipe through an inlet; and directing the fluid to exit the fluid passageway through an outlet to return to the interior cavity of the pipe.

19. The method in accordance with claim 16, wherein the channel extends along an entire length of the body assembly from the first end to the second end, and wherein directing fluid from the interior cavity of the pipe to flow through the fluid passageway and from the first end of the body assembly to the second end of the body assembly comprises directing the fluid to flow through fluid passageway within the channel along the entire length of the body assembly.

20. The method in accordance with claim 16, wherein the plurality of protrusions are spaced circumferentially about the body assembly.

* * * * *